United States Patent
Chun et al.

(10) Patent No.: US 11,601,525 B2
(45) Date of Patent: Mar. 7, 2023

(54) APPARATUS AND METHODS FOR CONTENT ACCESS, RETRIEVAL, AND DELIVERY IN A CONTENT DISTRIBUTION NETWORK

(71) Applicant: Time Warner Cable Enterprises LLC, New York, NY (US)

(72) Inventors: Jennifer Chun, New York, NY (US); Michael Angus, Santa Monica, CA (US); Julie Melendez, San Diego, CA (US); Mark Wang, San Diego, CA (US); James Gutierrez, San Diego, CA (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 592 days.

(21) Appl. No.: 14/166,788

(22) Filed: Jan. 28, 2014

(65) Prior Publication Data
US 2015/0215424 A1    Jul. 30, 2015

(51) Int. Cl.
*H04L 67/60* (2022.01)
*H04L 65/611* (2022.01)
*H04L 65/612* (2022.01)
*H04L 65/75* (2022.01)

(52) U.S. Cl.
CPC ............ *H04L 67/60* (2022.05); *H04L 65/611* (2022.05); *H04L 65/612* (2022.05); *H04L 65/765* (2022.05)

(58) Field of Classification Search
CPC . H04L 67/32; H04L 65/4076; H04L 65/4084; H04L 65/605; H04L 65/612; H04L 67/60; H04L 65/765; H04L 65/611
USPC .......................................................... 709/217
See application file for complete search history.

(56) References Cited

U.S. PATENT DOCUMENTS

| | | | |
|---|---|---|---|
| 6,865,608 B2 * | 3/2005 | Hunter | G06F 17/3089 707/999.009 |
| 6,993,573 B2 * | 1/2006 | Hunter | G06F 17/30879 235/462.11 |
| 7,602,820 B2 | 10/2009 | Helms et al. | |
| 8,412,798 B1 * | 4/2013 | Wang | H04L 67/06 709/206 |
| 9,607,131 B2 * | 3/2017 | Winograd | G06F 21/10 |
| 2001/0047426 A1 * | 11/2001 | Hunter | G06F 17/3089 709/238 |

(Continued)

*Primary Examiner* — Lance Leonard Barry
*Assistant Examiner* — Timothy Sowa
(74) *Attorney, Agent, or Firm* — Patent Beach PC

(57) ABSTRACT

Methods and apparatus for retrieving and delivering content in a network. In one embodiment, unique data codes representative of content are generated by a network entity. The data codes are distributed to viewers either via a physical medium or on a display of similar content. The user device requests the content from the network by reading the data code. The requested content is delivered directly to the requesting device or provided to another device identified by the requesting device or user. In another alternative, the unique data code may be representative of the user or subscriber himself. This type of data code may be generated by the network or the device, and enables the user to access content he is entitled to via another device or terminal by delivery of information contained in the data code (or the code itself) to the network.

20 Claims, 13 Drawing Sheets

(56) References Cited

U.S. PATENT DOCUMENTS

| | | | |
|---|---|---|---|
| 2001/0047428 A1* | 11/2001 | Hunter | G06F 17/3089 709/245 |
| 2003/0056217 A1 | 3/2003 | Brooks | |
| 2009/0170425 A1* | 7/2009 | Matsumoto | G06Q 20/202 455/3.06 |
| 2010/0094878 A1* | 4/2010 | Soroca | G06F 17/30035 707/748 |
| 2010/0251305 A1 | 9/2010 | Kimble et al. | |
| 2010/0268783 A1* | 10/2010 | Mizosoe | G06Q 10/107 709/206 |
| 2010/0323682 A1* | 12/2010 | Hatayama | H04H 20/08 455/422.1 |
| 2011/0090898 A1* | 4/2011 | Patel | H04L 12/66 370/352 |
| 2011/0103374 A1 | 5/2011 | Lajoie et al. | |
| 2011/0138064 A1* | 6/2011 | Rieger | G06F 17/30905 709/228 |
| 2011/0206128 A1* | 8/2011 | Jun | H04N 21/2343 375/240.16 |
| 2011/0264527 A1* | 10/2011 | Fitzpatrick | G06Q 30/02 705/14.55 |
| 2011/0282727 A1* | 11/2011 | Phan | G06Q 10/10 705/14.36 |
| 2012/0096499 A1* | 4/2012 | Dasher | H04N 21/4223 725/87 |
| 2012/0222071 A1* | 8/2012 | Gaede | H04N 5/765 725/38 |
| 2012/0234907 A1* | 9/2012 | Clark | G06F 17/30879 235/375 |
| 2012/0278142 A1* | 11/2012 | Li | G06Q 30/02 705/14.1 |
| 2012/0278622 A1* | 11/2012 | Lesavich | G06F 17/30864 713/168 |
| 2012/0331089 A1* | 12/2012 | Vonog | H04L 67/2823 709/217 |
| 2013/0080218 A1* | 3/2013 | Wildern, IV | G06F 17/30879 705/14.1 |
| 2013/0104162 A1 | 4/2013 | Helms et al. | |
| 2014/0047331 A1* | 2/2014 | Feldman | H04L 67/10 715/273 |
| 2014/0090001 A1* | 3/2014 | Das | H04N 21/4722 725/112 |
| 2014/0195653 A1* | 7/2014 | Alexander | H04L 67/10 709/219 |
| 2014/0222948 A1* | 8/2014 | Terasawa | G06F 13/00 709/213 |
| 2014/0307167 A1* | 10/2014 | Zehler | H04N 5/04 348/500 |
| 2014/0324947 A1* | 10/2014 | McKay | G11B 27/00 709/203 |
| 2017/0155941 A1* | 6/2017 | Rieger | H04N 21/25825 |

* cited by examiner

APPARATUS AND METHODS FOR CONTENT ACCESS, RETRIEVAL, AND DELIVERY IN A CONTENT DISTRIBUTION NETWORK

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The disclosure relates generally to the field of content and/or data access, retrieval, and delivery, such as via a content distribution (e.g., cable, satellite) or other network (including e.g., the Internet). In one exemplary aspect, the disclosure relates to the use of a data code (such as a Quick Response or QR code) for accessing, retrieving and delivering content and/or data.

2. Description of Related Technology

Recent advances in content delivery technologies have led to the proliferation of different content sources carrying a wide variety of content. A viewer may be easily overwhelmed by the presentation of hundreds of broadcast channels, purchasable content channels (e.g., VOD, pay-per-view, etc.) and the like, offering programming 24 hours per day. With such an abundance of content offered, the user may be unable to rapidly and easily locate content of interest at any one time.

Likewise, other technological advancements have brought into common use machine-readable representations of data relating to a particular object as well as electronic devices that can read and process the data to identify the object. For example, a barcode (including linear barcodes and/or matrix or two dimensional barcodes) may allow for convenient and simplified identification of items. A unique barcode is associated to a particular item; a barcode reader is then employed to read the barcode and swiftly identify the item and/or information relating to the item.

The QR Code® is an exemplary two-dimensional barcode of common use. The information encoded by a QR code may be made up of four standardized types ("modes") of data numeric, alphanumeric, byte/binary, Kanji. However, through various supported extensions, QR Codes can be adapted to comprise virtually any type of data. Advantages of the QR Code system over standard (e.g., UPC) barcodes include that the QR Code system has faster readability and greater storage capacity. Generally, QR code consists of black modules (square dots) arranged in a square grid on a white background, which can be read by an imaging device (such as a camera); data is then extracted from patterns present in both horizontal and vertical components of the image. In one implementation, a smartphone may be used as a QR-code scanner, which reads and converts the code to a useful form (such as a standard URL for a website, thereby obviating the need for a user to type it manually into a web browser). Currently, various smartphone and mobile devices include or may download software which enables the device to read QR Codes and using a browser which supports URL redirection, enable the data read from the QR Code to send metadata enabling a hard link to the URL described in the QR Code.

Barcodes have been further utilized with respect to viewable content (i.e., media content) in the National Film Board of Canada and ARTE France web documentary entitled "Barcode.tv", which allows users to view films about everyday objects by scanning the product's barcode with their device camera.

What are needed are apparatus and methods for utilizing barcodes or other data codes to access audio/video content from a content delivery network. Ideally, such apparatus and methods would take advantage of the data code technology to provide heretofore unavailable services (as discussed herein).

SUMMARY

The present disclosure addresses the foregoing needs by providing, inter cilia, apparatus and methods for content access, retrieval, and delivery in a content distribution network.

In a first aspect, a method for accessing and delivering content in a managed network is disclosed. In one embodiment, the method comprises: (i) associating individual ones of a plurality of content elements to respective ones of a plurality of unique data codes, the plurality of content elements being stored at a storage entity of the managed network, (ii) enabling distribution of at least one of the plurality of unique data codes, the distribution enabling at least one user device to read the unique data code, (iii) receiving at a server entity of the managed network, in response to the at least one user device reading the unique data code, a request for a content element associated to the unique data code, (iv) utilizing information in the request to identify the content element in the storage entity, and (v) delivering the content element.

In a second aspect, a method for accessing and delivering content in a managed network is disclosed. In one embodiment, the method comprises: (i) providing data to a subscriber apparatus, the data enabling the subscriber apparatus to generate a unique data code representative of a subscriber associated thereto, (ii) receiving a request for content from a terminal apparatus, the request comprising at least information obtained by the terminal apparatus from reading the unique data code from a display device associated with the subscriber apparatus, (iii) utilizing the information obtained by the terminal apparatus to verify that the subscriber is entitled to receive the requested content, and (iv) when it is determined that the subscriber is entitled to receive the requested content, providing the requested content to the terminal apparatus.

In a third aspect, a client device configured for use in a content delivery network is disclosed. In one embodiment, the client device comprises: a first interface configured for communication to the content delivery network, a storage apparatus, and a processor. In one variant, the processor is configured to execute at least one computer program thereon, the at least one computer program comprising a plurality of instructions which are configured to, when executed, utilize information contained in a unique data code to request a particular media content stored at a storage entity of the content delivery network for delivery either to the client device or to another device in communication with or associated to the client device.

In a fourth aspect, a computer medium configured to store a computer program thereon is disclosed. In one embodiment, the computer program comprises a plurality of instructions which are configured to, when executed by a processor, utilize information contained in a unique data code to request a particular media content stored at a storage entity of the content delivery network for delivery either to the client device or to another device in communication with or associated to the client device.

In a fifth aspect, a system for accessing and delivering content in a managed network is disclosed. In one embodiment, the system comprises at least one network entity, at least one data code reader, and at least one display device. In one variant, the display device is configured to display content related to a data code read by said data code reader and provided by said at least one network entity.

These and other aspects shall become apparent when considered in light of the disclosure provided herein.

Figure 1:
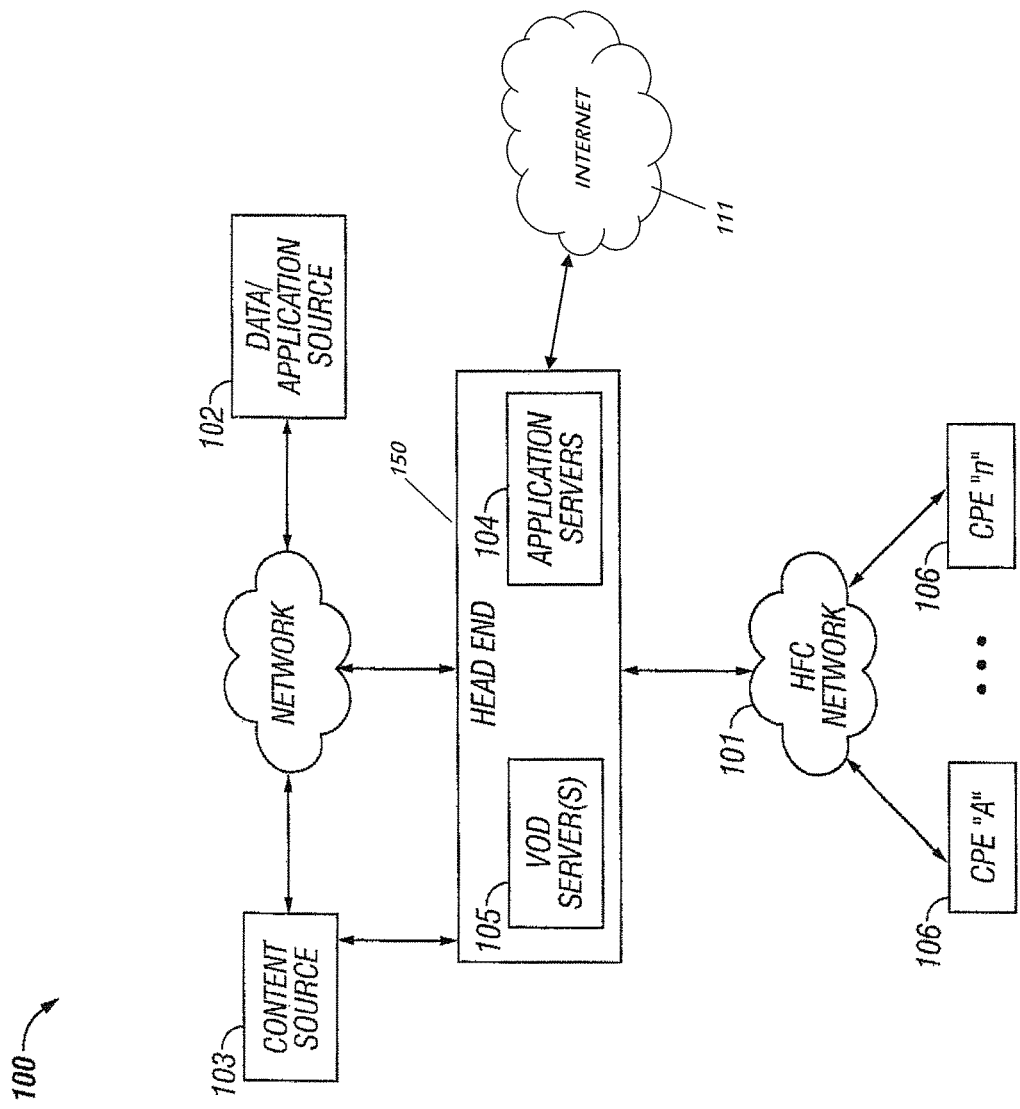
FIG. 1 is a functional block diagram illustrating an exemplary hybrid fiber network configuration useful with the present disclosure.

All Figures © Copyright 2013 Time Warner Cable, Inc. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DivX®, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, JavaBeans®, etc.) and the like.

The term "Customer Premises Equipment (CPE)" refers without limitation to any type of electronic equipment located within a customer's or user's premises and connected to or in communication with a network.

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "display" means any type of device adapted to display information, including without limitation CRTs, LCDs, TFTs, plasma displays, LEDs, incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0.

As used herein, the term "headend" refers generally to a networked system controlled by an operator (e.g., an MSO) that distributes programming to MSO clientele using client devices. Such programming may include literally any information source/receiver including, inter alfa, free-to-air TV channels, pay TV channels, interactive TV, and the Internet.

As used herein, the terms "Internet" and "internet" are used interchangeably to refer to inter-networks including, without limitation, the Internet.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, ZigBee®, narrowband/FDMA, OFDM, PCS/DCS, LTE/LTE-A, analog cellular, CDPD, satellite systems, millimeter wave or microwave systems, acoustic, and infrared (i.e., IrDA).

Overview

The present disclosure provides, inter alia, methods and apparatus for accessing, retrieving, and delivering content in a network.

In one aspect, one or more network apparatus are provided to generate a unique data code representative of each content item provided by the content source and stored at the network. The unique data codes once generated, are provided back to the content source to enable the content source to distribute physical media including marketing materials (such as business cards, pamphlets, magazine or newspaper articles, banners, posters, billboards, etc.) which promote particular content.

In one variant, the content source comprises an individual artist or group of artists and the foregoing mechanisms enable the artist to promote his or her content. Additionally, nationally recognized content sources (e.g., Universal, MGM, etc.) may use the aforementioned data codes to present marketing materials to a nation-wide audience. A user, upon receiving the distributed marketing materials, uses a data code reader (such as a data code reader associated with the user's device) to read the data code. The user device utilizes information in the data code and/or the data code itself to request content from the network. Delivery of the content from the network may occur either directly to the requesting device. Alternatively, the requested content may be provided to another device identified by the requesting device or pre-established by the user as the "default device" for receiving such deliveries. In a further embodiment, all devices associated with a user may receive the requested content in some form (i.e., content received at a mobile device may be in a shortened or otherwise altered format to make efficient use of that platform, while content received at a premises device or CPU may be long or full format).

In another aspect, a subscriber device is given an ability to generate a data code which is unique to and representative of the subscriber and/or subscriber account. The device uses information obtained from the managed network to generate the data code. Alternatively, the data code may be generated by the network and merely provided for display at the client device. The data code is then displayed by the device and read by a second device or terminal. The second device or terminal may be managed by the same network to which the subscriber is subscribed, a managed by a different network, or may be unmanaged yet in communication with one of the aforementioned networks. The second device or terminal can then use the data code (or information contained therein) to request content from the managed or unmanaged network for display to the subscriber at the second device or terminal. In this manner, a network subscriber is able to access and display content he is entitled to on any terminal device capable of reading the data code generated and/or displayed by the subscriber's device.

In yet another aspect, one or more network apparatus are provided to generate a unique data code representative of each content item provided by the content source and stored at the network. The unique data codes, once generated, are inserted onto a display of the content (either by an entity of the managed network, by the content source, by entity of another network in communication with the managed network, or by the display device). In this manner, the content source is able to distribute content which identifies itself (via the data codes) so that device users of the same or another network may easily have the same content provided via their own network and to any of their devices.

Detailed Description of Exemplary Embodiments

Exemplary embodiments of the apparatus and methods of the disclosure are now described in detail. While these exemplary embodiments are described in the context of a hybrid fiber coax (HFC) cable system architecture having an multiple systems operator (MSO), digital networking capability, IP delivery capability, and plurality of client devices/CPE, the general principles and advantages of the present disclosure may be extended to other types of networks and architectures, whether broadband, narrowband, wired or wireless, managed or unmanaged, or otherwise, the following therefore being merely exemplary in nature.

It will also be appreciated that while described generally in the context of a consumer (i.e., home) end user domain, the present disclosure may be readily adapted to other types of environments (e.g., commercial/enterprise, government/military, etc.) as well. Myriad other applications are possible.

Also, while certain aspects are described primarily in the context of the well-known Internet Protocol, it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Network—

FIG. 1 illustrates a typical content delivery network configuration with which the exemplary apparatus and methods of the present disclosure may be used. The various components of the network 100 include (i) one or more data and application origination points 102; (ii) one or more content sources 103, (iii) one or more application distribution servers 104; (iv) one or more VOD servers 105, and (v) client devices or customer premises equipment (CPE) 106. The distribution server(s) 104, VOD servers 105 and CPE(s) 106 are connected via a bearer (e.g., HFC) network 101 (also referred to herein as a content delivery network (CDN)). The headend is also connected through a gateway or other such interface (not shown) to unmanaged external internetworks such as the Internet 111.

A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the disclosure. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. As will be discussed in greater detail below, in one embodiment the CPE may include IP-enabled devices, mobile devices, etc. (although not illustrated in FIGS. 1-1d).

Figure 1A:
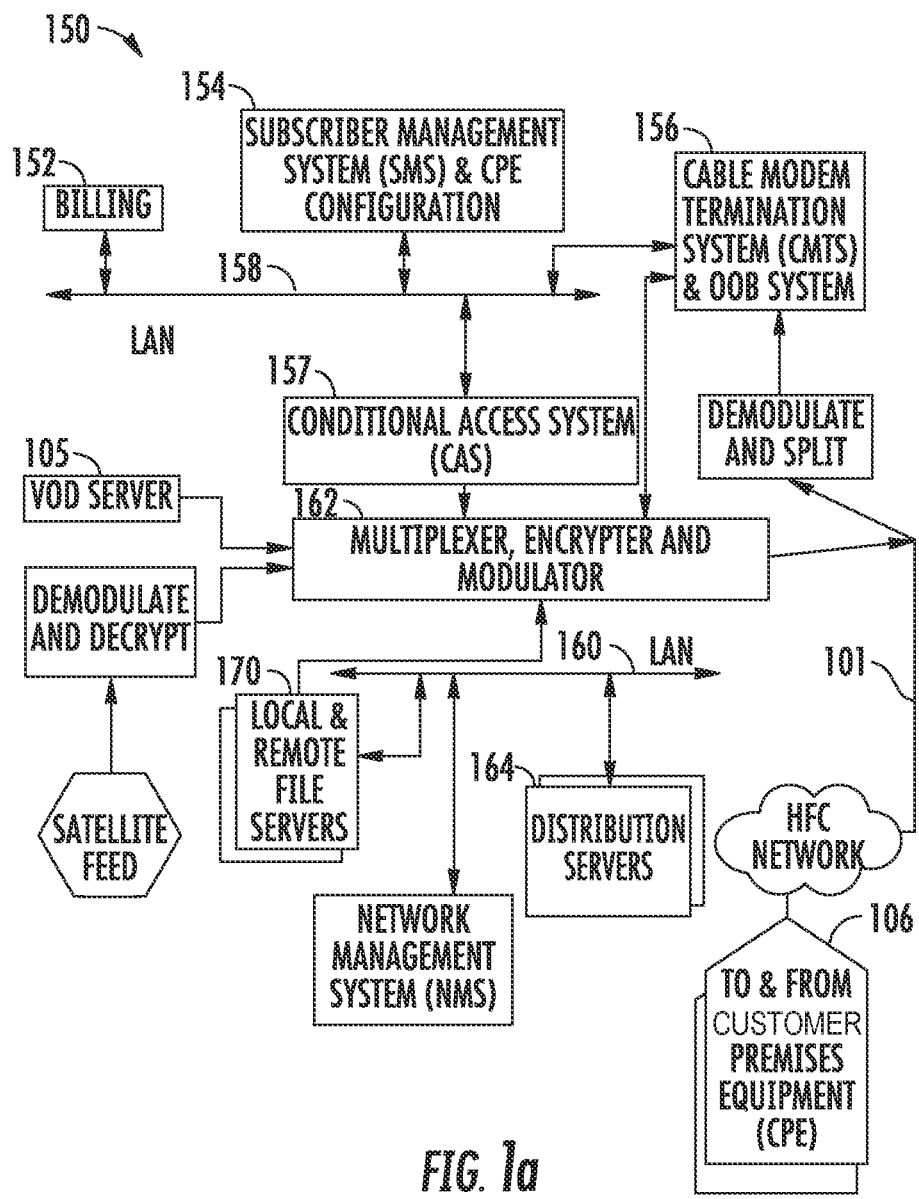
FIG. 1a is a functional block diagram illustrating one exemplary network headend configuration useful with the present disclosure.

Referring now to FIG. 1a, one exemplary embodiment of a headend architecture useful with the present disclosure is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture and that each MSO may have multiple headends deployed using custom architectures.

Figure 1B:
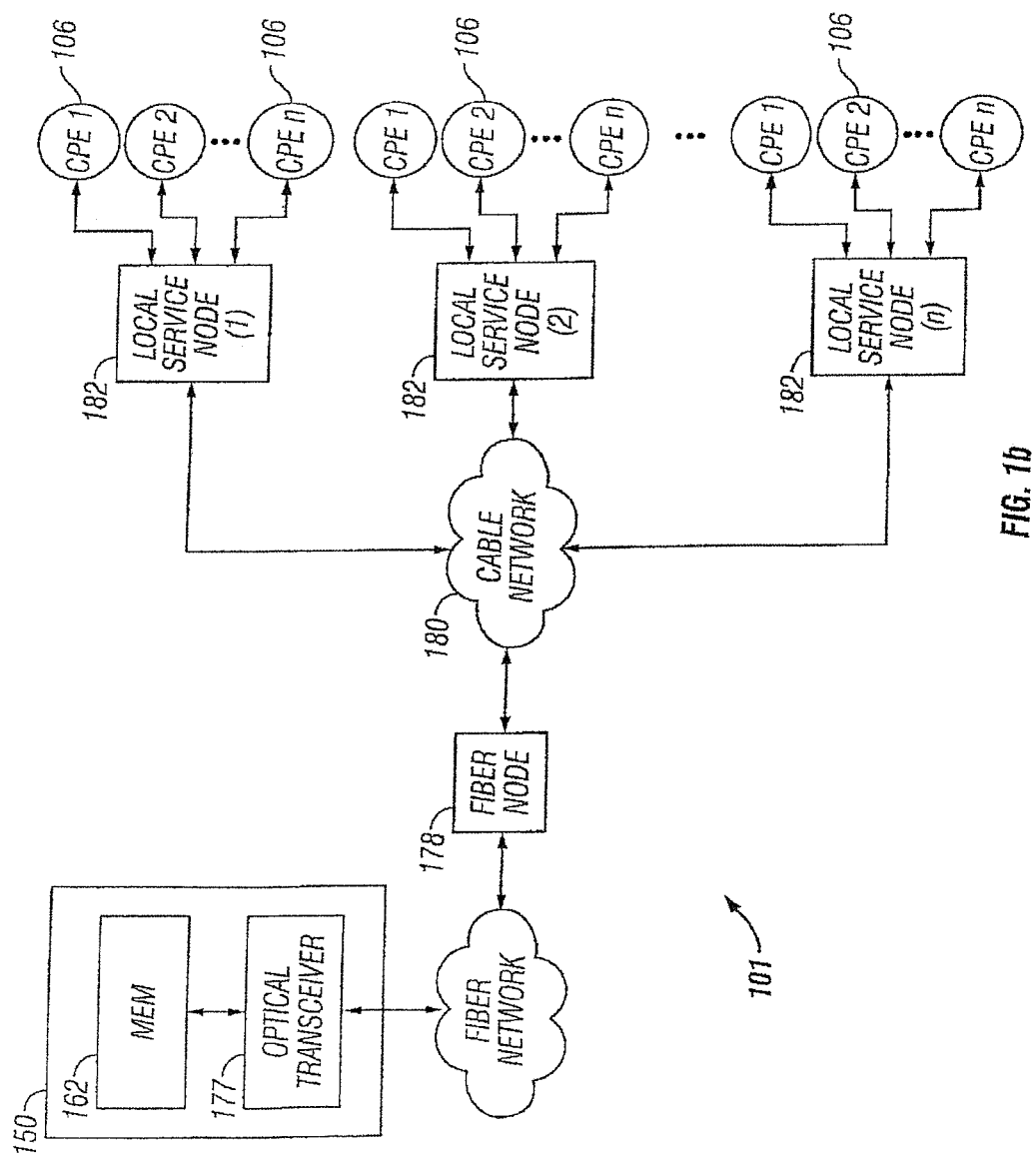
FIG. 1b is a functional block diagram illustrating one exemplary local service node configuration useful with the present disclosure.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

Figure 1C:
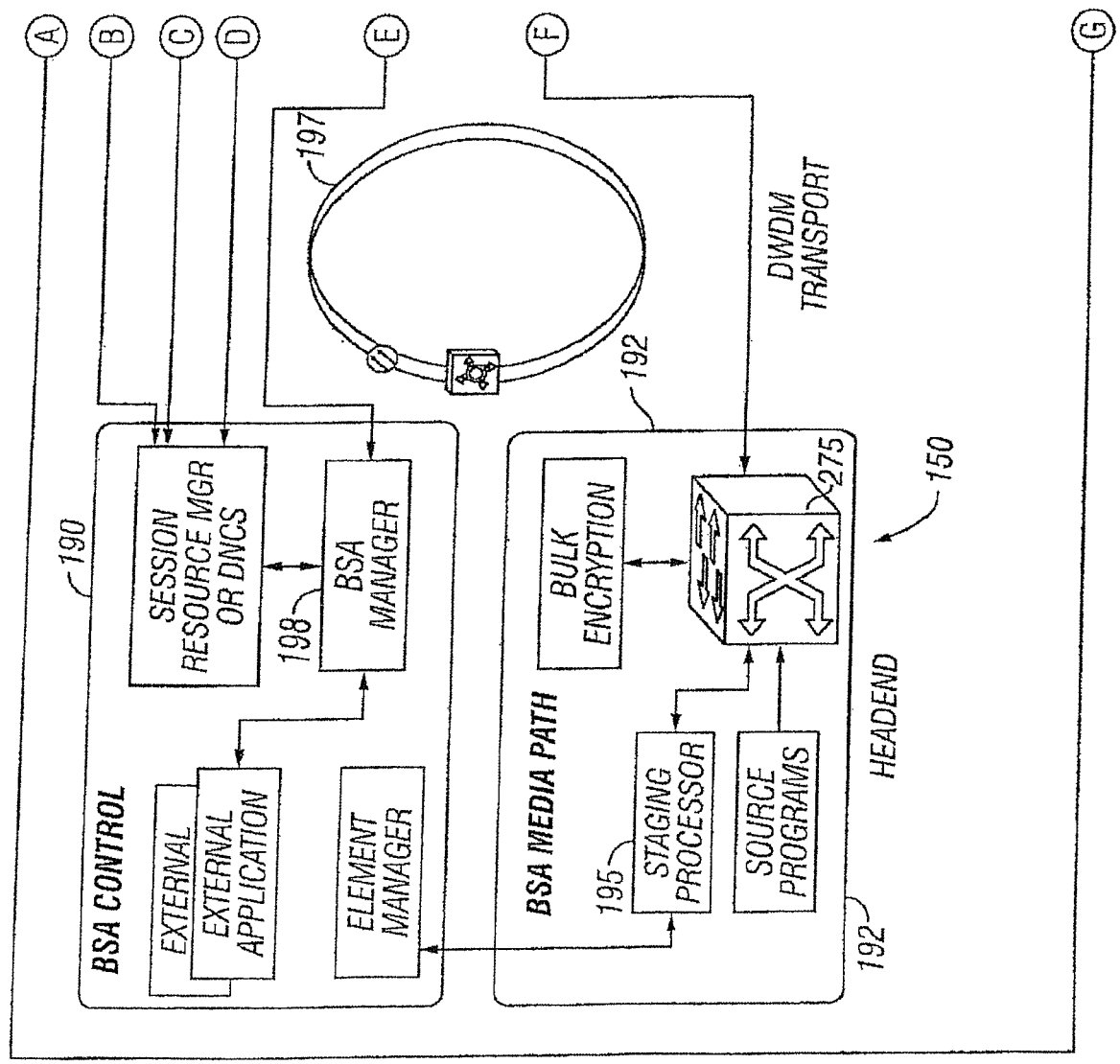
FIG. 1c is a functional block diagram illustrating one exemplary broadcast switched architecture (BSA) network useful with the present disclosure.
Figure 1C:
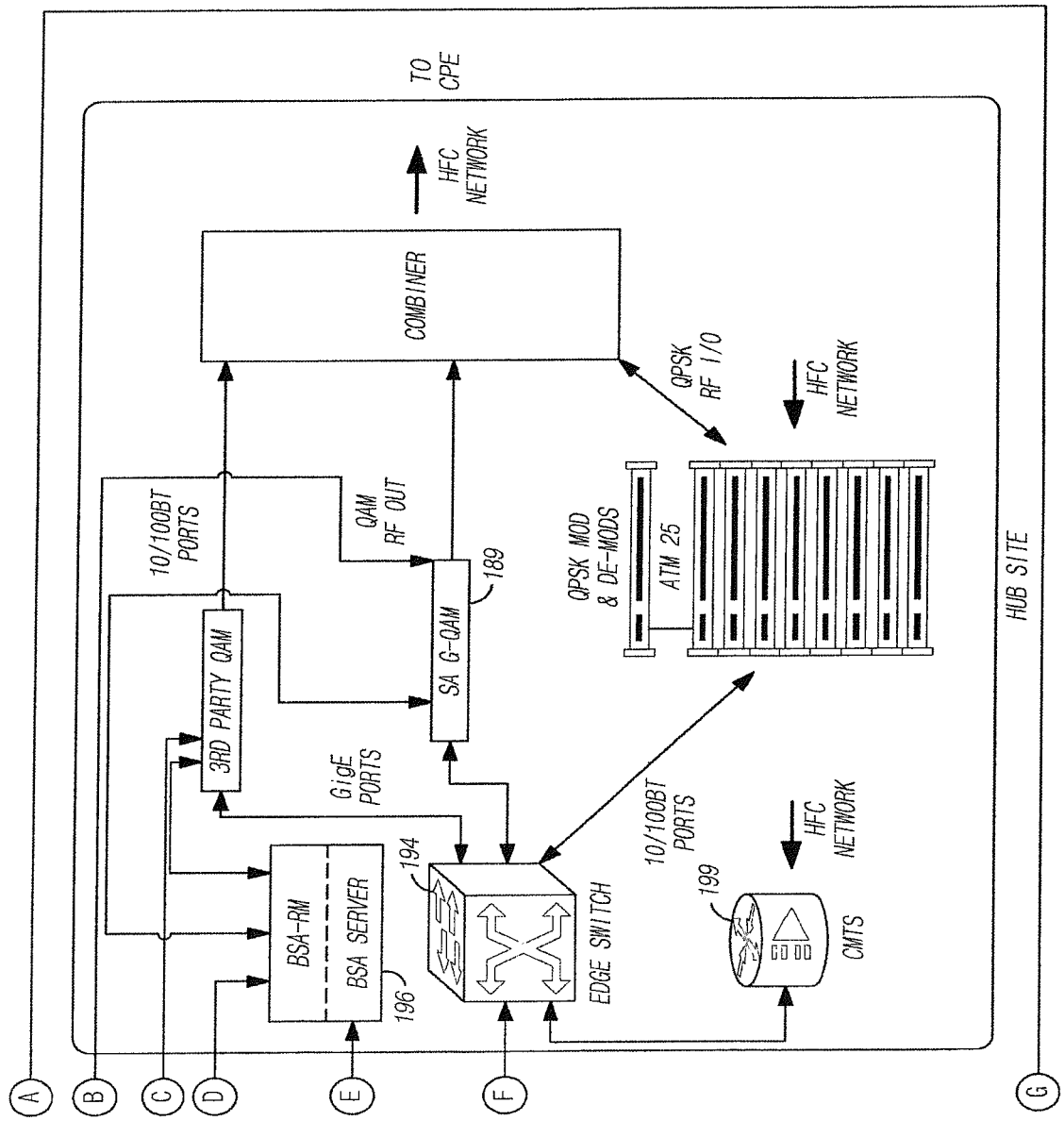

It will also be recognized, however, that the multiplexing operation(s) need not necessarily occur at the headend 150 (e.g., in the aforementioned MEM 162). For example, in one variant, at least a portion of the multiplexing is conducted at a BSA/SDV switching node or hub (see discussion of FIG. 1c provided subsequently herein). As yet another alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter glia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the disclosure is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

An optical transport ring (not shown) is also commonly utilized to distribute the dense wave-division multiplexed (DWDM) optical signals to each hub within the network in an efficient fashion.

"Switched" Networks—

FIG. 1c illustrates an exemplary "switched" network architecture. While a so-called "broadcast switched architecture" (BSA), also known as "switched digital video" or "SDV", network is illustrated in this exemplary embodiment for performing bandwidth optimization/conservation functions, it will be recognized that the present disclosure is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these elements cooperate to control and feed, respectively, downstream or edge switching devices 194 at the hub site which are used to selectively switch broadcast streams to various service groups. A BSA or SDV server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

U.S. Patent Application Publication No. 2003/0056217 filed on Sep. 20, 2001 entitled "TECHNIQUE FOR EFFECTIVELY PROVIDING PROGRAM MATERIAL IN A CABLE TELEVISION SYSTEM", and issued as U.S. Pat. No. 8,713,623 on Apr. 29, 2014, which is incorporated herein by reference in its entirety, describes one exemplary broadcast switched digital architecture useful with the present disclosure, although it will be recognized by those of ordinary skill that other approaches and architectures may be substituted.

A primary advantage of the BSA paradigm is bandwidth conservation/preservation. Bandwidth for unviewed programs is not consumed, and can be re-allocated. Similarly, new programs can be added without adding bandwidth. Advantageously, programs with narrow appeal can be added in a BSA system with little if any bandwidth impact. More popular programs will impact the BSA bandwidth, but to a lesser extent than was traditionally the case. Multiple bitrates can also be made available for use or sale to programmers or advertisers.

In one exemplary embodiment, the methods and apparatus of co-owned, co-pending U.S. Patent Application Publication No. 2011/0103374 filed on Apr. 21, 2010 entitled "APPARATUS AND METHODS FOR PACKETIZED CONTENT DELIVERY OVER A BANDWIDTH-EFFICIENT NETWORK", and issued as U.S. Pat. No. 10,264,029 on Apr. 16, 2019, which is incorporated herein by reference in its entirety, may be utilized. As discussed therein, packetized content is provided to subscribers of an MSO network via extant bandwidth-optimized network infrastructure. In one embodiment, various legacy and IP-capable user devices receive a list of available content, from which a user may select. The user's selection is transmitted to an intermediary device or proxy (such as gateway apparatus in the home, or a headend server) which formats the request according to a standardized protocol utilized by a server (e.g., the BSA/SDV server of FIG. 1c) for providing bandwidth-optimized delivery of content. The server uses one or more bandwidth optimization techniques to provide the requested content to the proxy. If the content is requested by an IP-capable device, the proxy formats the content using protocol translation. The formatted content is then delivered to the requesting IP-capable CPE. However, if the content is requested from a legacy device (e.g., a non-IP enabled STB), protocol translation is not necessary. In this manner, IP and legacy CPE can be freely intermixed in any proportion in the service group and home, the gateway or headend proxy being configured to deliver content regardless of the requesting device.

Packetized Content Delivery Network—

Figure 1D:
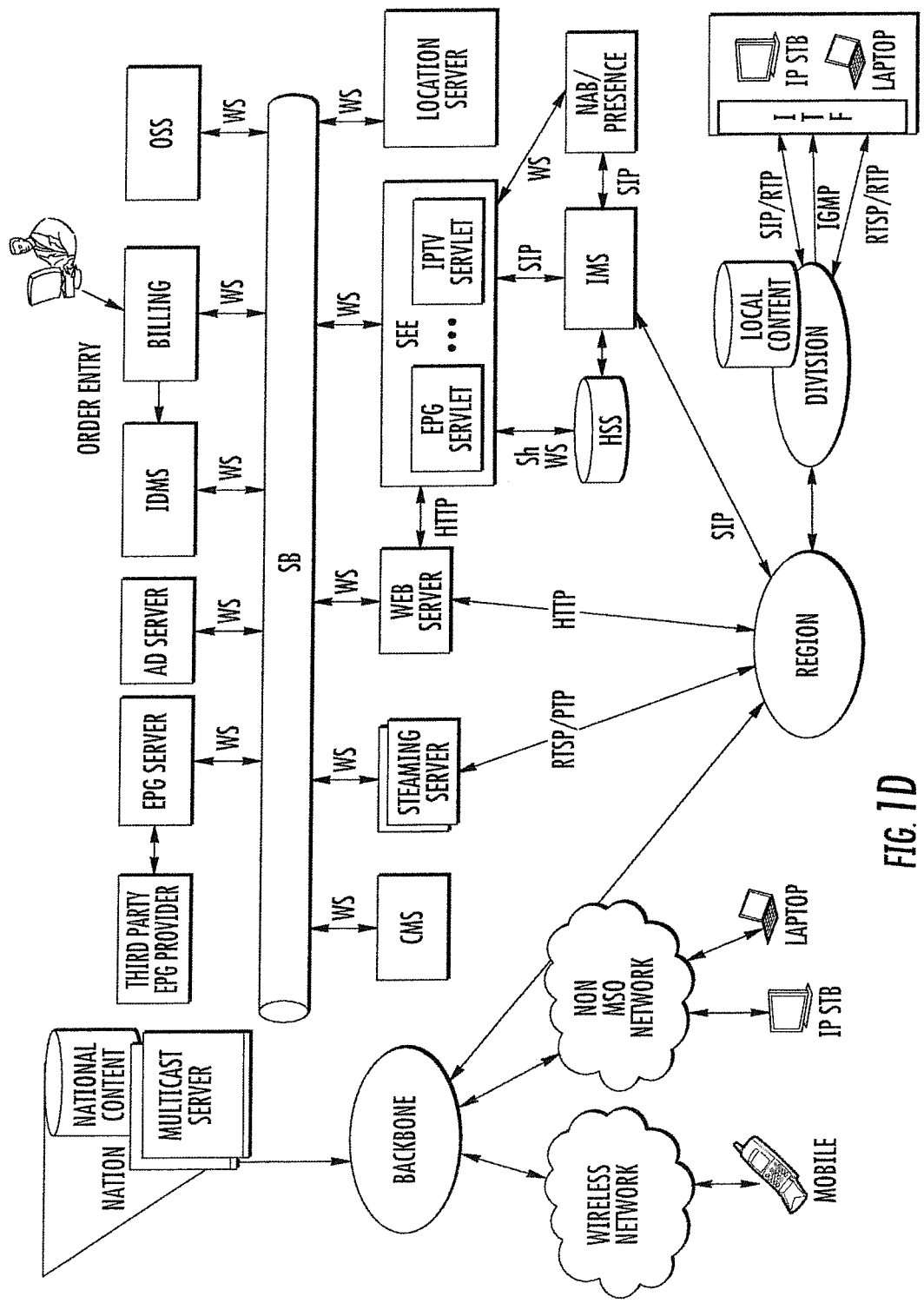
FIG. 1d is a functional block diagram illustrating one exemplary packetized content delivery network architecture useful with the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in U.S. Patent Application Publication No. 2011/0103374 filed on Apr. 21, 2010, entitled "METHODS AND APPARATUS FOR PACKETIZED CONTENT DELIVERY OVER A CONTENT DELIVERY NETWORK", and issued as U.S. Pat. No. 10,264,029 on Apr. 16, 2019, incorporated herein by reference in its entirety. Such a network provides significant enhancements in terms of common control of different services, implementation and management of content delivery sessions according to unicast or multicast models, etc.; however, it is appreciated that the various features of the present disclosure are in no way limited to any of the foregoing architectures.

Access and Retrieval Network Architecture for Unrestricted Content—

Figure 2:
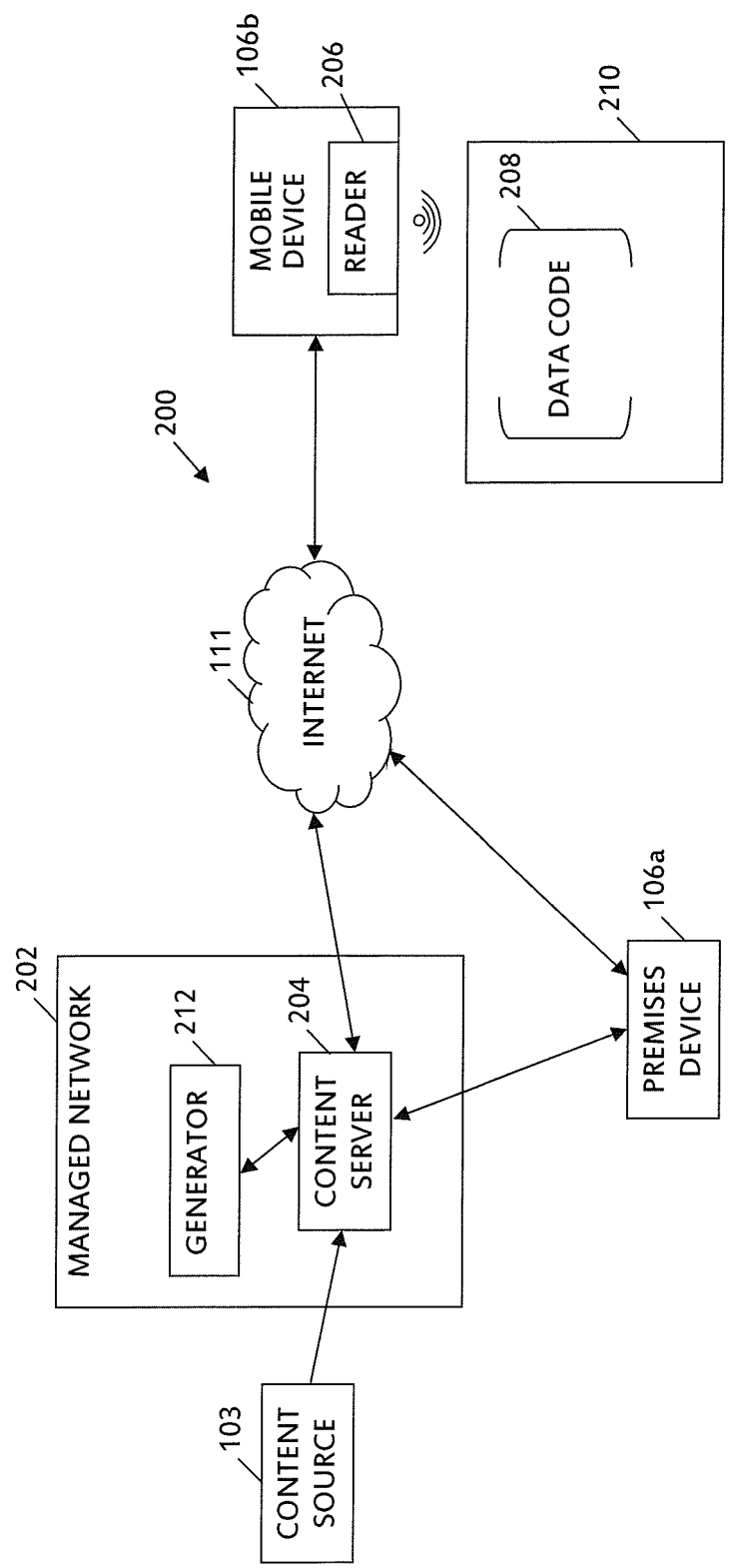
FIG. 2 is a functional block diagram illustrating an exemplary embodiment of a network architecture configured in accordance with the present disclosure.

An exemplary access and retrieval network architecture 200 for the delivery of unrestricted content is illustrated in FIG. 2. As shown, the network 200 generally comprises a content source 103 which provides content to a content server 204 of a managed network 202. In one embodiment, the managed network 202 is of the type discussed above with respect to FIGS. 1-1d.

As discussed above, the managed network 202 may comprise a cable network 100 having a headend 150 (as illustrated in FIG. 1a), which generally manages delivery of content to a plurality of client devices or CPE 106. In the embodiment of FIG. 2, the client devices may comprise client premises devices 106a (such as e.g., set top boxes, digital video recorders, personal computers, and other client equipment that generally remains at the user's premises) and mobile devices 106b (such as e.g., laptop computers, smart phones, hand held or notebook computers, and other client equipment that is intended to be mobile with the user both at the user's premises and elsewhere).

Content is delivered to the premises devices 106a and mobile devices 106b using the systems and methods discussed in FIGS. 1-1d. In other words, content is stored at the content server 204 and delivered to the devices 106a, 106b in the form of content streams (such as via a video on demand or VOD delivery system, IP packetized, QAM modulated, broadcast, etc.). In the embodiment of FIG. 2, the content is unprotected or unrestricted content. In other words, the content is such that protections or restrictions are unnecessary. For example, the content may comprise advertising materials, content clips, samples, trailers, or teasers.

The content sources 103 benefit from mass distribution of such content therefore restrictions or protections are unnecessary or minimal.

A data code generator 212 is provided at the managed network 202. The data code generator 212 generates a unique data code 208 for each content element uploaded to the content server 204. In addition to storing and managing content on behalf of the content source 103, the content server 204 is configured to manage a directory or database (not shown) which comprises a correlation of individual ones of a plurality of content or data items to unique data codes 208.

The data codes 208 may comprise so-called Quick Response or QR Codes®, or other matrix barcodes, whether one or two-dimensional, which are machine-readable (i.e., readable using a scanner, barcode reader, or other interpretive software running on a computerized device). It is appreciated however that the content source 103 itself may be charged with generating and applying data codes 208 to the content. The data codes 208, in one embodiment, once assigned to particular content are distributed on physical media 210 such as fliers, pamphlets, magazine or newspaper pages, billboards, business cards, etc. by a content owner (i.e., the content source 103 or entity which uploaded the content to the server 204). In this manner, the managed network 202 is able to provide a means for enabling content suppliers or sources 103 to mass distribute data codes 208 that are linked to content stored at the managed server 204. In another variant, the data codes 208 comprise Near Field Communication (NFC) chips and are applied to the physical media.

In addition, a database (not shown) or other storage entity may be provided at the managed network 202 for storing a directory or plurality of records correlating individual ones of the media content or data items to unique data codes 208. The database is accessed and managed, in one embodiment, by the content server 204.

In the illustrated embodiment, the mobile device 106b is configured to run a client application thereon which enables the mobile device to use a reader 206 (whether software or hardware implemented) to read a data code 208. The mobile device 106b may then use the data code 208 to request the content (identified to the user on the physical media 210) from the network 202 via communication therewith over the Internet 111. The content server 204 accesses the records or database (not shown) when information from the data code 208 is received in connection with a request for content. It is further noted that the mobile device users which request access to the content are not required to be subscribers to the managed network in order to receive access to the content.

In one exemplary embodiment, the data codes 208 contain information relating to an address or URL within the storage apparatus of the particular MSO. The address or URL enables the network to quickly identify the location of the particular content to which the address or URL is associated and provide the requested content. Alternatively, the data codes 208 may be used to more generally or universally reference a particular program (in much the same manner as current uniform product codes (UPC)). For example, the data code 208 may specifically refer to Episode 7, Season 3 of Breaking Bad. In the instance, a uniform or universal code is used, the present disclosure would further make use of a cross-reference of the code, or information contained therein, against an MSO managed database in order to identify the content.

In a further embodiment, the data codes 208 may contain information relating to a date and/or time for an expiration thereof, a number of permissible usages thereof, or other rule relating to the use of the code. In one example, the data codes 208 may indicate that the content may e.g., only be accessed once.

In yet another embodiment, the data codes 208 include an identifying strong associated with a time, location, and/or point of distribution. Using this information, the system can determine a geographic area within which a given content type is generally of interest. For example, it may be derived that data codes 208 distributed within the 92102 area code are highly utilized for requesting content when the content is related to a particular music genre.

Still further, information in the data codes 208 may be utilized to anonymously collect statistics regarding viewership. For example, the network may determine demographics for specific content traffic in order to identify and provide content which is similar or related to the content determined to be popular for that particular device, or to a demographic to which the device is associated, etc.

In a further variant, the data codes 208 as discussed herein may be utilized to trigger various other transactions. For example, the data codes 208 may trigger an offer to be sent to the reading device such as to subscribe to a faster High Speed Data (HSD) tier, and/or to add packages or services not currently offered in their subscription plan (e.g., HBO, etc.). The offer itself may be embedded within the data code 208 in addition to information specifying particular content.

Still further, the data codes 208 discussed herein may be utilized to identify to a user of the device an MSO specific application which enables access to content via the herein-described systems and methods and which may be downloaded to the user's device.

An exemplary method utilizing the network 200 of FIG. 2 is described herein.

Exemplary Methodology for the Access, Retrieval and Delivery of Unrestricted Content—

Figure 3:
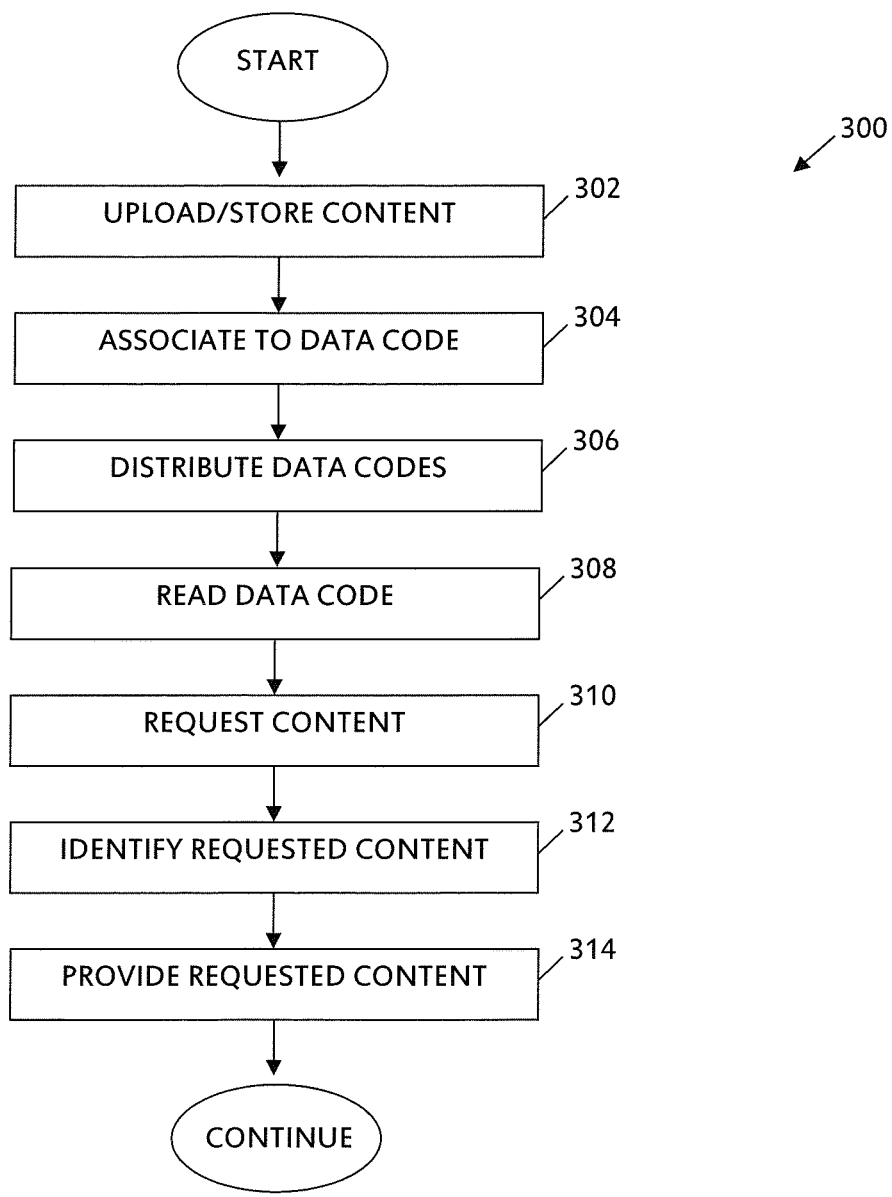
FIG. 3 is a logical flow diagram illustrating an exemplary embodiment of a generalized method for accessing, retrieving, and delivering content.

Referring now to FIG. 3, an exemplary embodiment of a method 300 for accessing, retrieving and delivering unrestricted content according to the disclosure is shown.

Per step 302, content is uploaded from a content source 103 to the content server 204 of a managed network 202. As noted above, in one embodiment, the content may comprise content such as advertisements, content clips, trailers, shorts, behind the scenes, gag reels, etc. for which protection is unnecessary. However, it is appreciated that in certain instances content may be protected via the mechanisms discussed elsewhere herein. It is further appreciated that the content sources 103 may include major content generating entities (i.e., film and television companies), as well as individual users, and/or smaller content generating entities (such as start-ups, etc.). For example, a new musician may make his/her audio and/or video content available at the content server 204 by uploading it and allowing access according to the methods discussed herein. Additionally, a major broadcast company such as Fox Broadcasting Company® may upload content for mass distribution as discussed herein. In yet a further example, an individual may upload home videos and/or pictures and make these accessible via the data code distribution discussed herein as well. A plurality of content types and uses for the present disclosure are appreciated herein, the foregoing being merely exemplary.

Next per step 304, the uploaded content is associated to a unique data code. As discussed elsewhere herein, the data codes 208 may comprise one or two dimensional bar codes, or other machine readable code format. The data codes 208 associate each content item to a respective space within the server 204 storage. For example, the data code 208 may comprise a QR Code which represents a uniform resource locator (URL) of the storage address of the content within the server 204. Other data codes and mechanisms for identifying the portion of a storage entity dedicated to the particular content may be used as well.

The data codes 208 may then be distributed on physical medium 210 (step 306). In one instance, the managed network 202 will, once content has been uploaded (step 302) and assigned a unique data code (step 304), provide confirmatory email or other communication including the assigned data code to the content source 103, The content source 103 is then able to reproduce the data code 208 for mass distribution on a physical medium 210, such as business cards, magazine advertisements, posters, etc. (step 306).

At step 308, the data code 208 is read by a mobile device 106*b* having a reader 206 specifically designed to recognize and interpret the data code 208. Using information contained in the data code 208, the mobile device 106*b* requests the content from the content server 204 via a communication between the device 106*b* and the managed network 202 over the Internet 111 (or other network connection) at step 310. The mobile device 106*b* may process the data code 208 to extract the information necessary to locate the content at the network (such as e.g., the URL encoded by the data code), or may simply transmit the data code to the network for processing and identification thereat.

In one variant, the request further contains information identifying the mobile device 106*b* and/or the user thereof. This information may be utilized by the system to determine whether the user is a subscriber of the managed network 202 via a comparison to billing records stored at the managed network 202. When the user and/or device is not registered as a subscriber of the network 202, promotions or advertising promoting the managed network 202 itself may be provided thereto. In addition, special services may be made available to devices and/or users determined to be subscribers. For example, further content may be identified using the apparatus and methods of co-owned, co-pending U.S. patent application Ser. No. 12/414,576 filed on Mar. 30, 2009 entitled "RECOMMENDATION ENGINE APPARATUS AND METHODS", and issued as U.S. Pat. No. 9,215,423 on Dec. 15, 2015, which is incorporated herein by reference in its entirety. As discussed therein, a mechanism is provided which is configured to learn (and unlearn) the user's preferences based on actions taken with regard to content. Accordingly, based on the user's content request via the data code 208, the system may determine other content at the server 204 which may be of interest to the user and provide an option to receive this content as well.

As noted above, each data code 208 is unique to a particular content item and associated to a specific portion of a storage entity, hence information contained in the data code 208 is used by the content server 204 to identify the content at step 312. Once identified, the content is provided at step 314. The requested content may be provided to the requesting mobile device 106*b*, a second client device which the mobile device 106*b* has designated in the request, or to a previously identified device which a user has pre-registered to the network as the default device for receiving content requests from data code reads. Additional formatting and processing may be performed prior to delivery of the content based on the type of device identified as receiving the content.

Delivery of content as discussed herein may include options to have the content delivered for display on the requesting device, recorded to a digital video recorder (DVR) associated with the device, recorded as a series (i.e., this and all future episodes) to a DVR, added to a "playlist" or "queue" associated with a particular device or a subscriber (and therefore persistent across multiple devices).

The foregoing methods may be used for example, to enable a content source to distribute marketing materials that include data codes which enable device users to be linked to special content, content clips, or other materials to pique the user's continued interest.

Access and Retrieval Network Architecture for Restricted Content—

Figure 4:
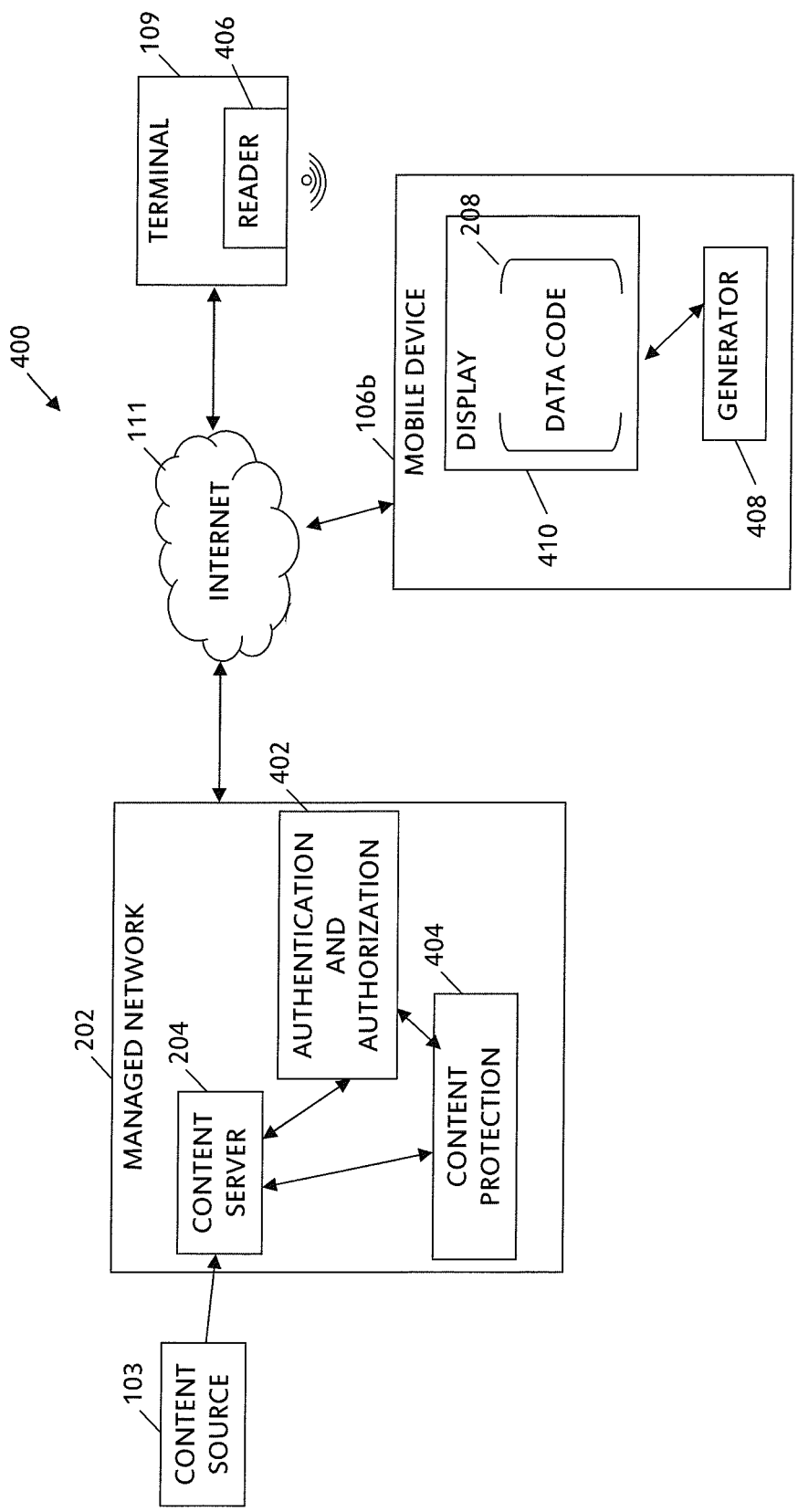
FIG. 4 is a functional block diagram illustrating another exemplary embodiment of a network architecture configured in accordance with the present disclosure.

As noted above, the content accessed, retrieved and/or distributed in the embodiment of FIGS. 2-3 comprises unrestricted content. FIG. 4 illustrates an exemplary access and retrieval network architecture 400 for the delivery of restricted content. As shown, the network 400 generally comprises a content source 103 which provides content to a content server 204 of a managed network 202. In one embodiment, the managed network 202 is of the type discussed above with respect to FIGS. 1-1*d*. The managed network 202 of the embodiment of FIG. 4 further comprises an authentication/authorization entity 402 and a content protection entity 404 which will be discussed in greater detail below.

The mobile device 106*b* of FIG. 4 comprises a data code generator 408 which uses information about a subscriber of the network 202 to generate subscriber specific temporary data codes 208. The subscriber specific information is obtained via a communication between the generator 408 and the authentication/authorization apparatus 402 of the managed network 202. Communication therebetween may occur via a direct link, or via the Internet 111. The data codes 208 are then displayed on a display apparatus 410 of the device to be read by e.g., a data code reader 406 of a terminal device 109. In another alternative, the data code may be generated by the network and merely provided for display at the client device 106*b*.

In addition, a database (not shown) or other storage entity may be provided at the managed network 202 for storing a directory or plurality of records correlating a unique data code 208 to each subscriber of the managed network.

The terminal 109, in one embodiment, is configured to read a data code (via the code reader 406), and communicate with the managed network 202 via a network interface (not shown). In one embodiment the terminal 109 communicates with the managed network 202 via the Internet 111. However, it is also appreciated that the terminal 109 may communicate with the managed network 202 directly, and/or via any non-IP packetized communication means as well (such as e.g., over DOCSIS, etc. as discussed above with respect to FIGS. 1-1*c*).

The content server 204 uses information provided in the request (such as information contained in the data code 208 and information identifying requested content) to query the database (not shown) and identify the requesting subscriber, as well as the content being requested. The authentication/authorization 402 entity at the managed network 202 identifies whether the requesting device 106*b* is associated to an authenticated subscriber via information contained in the data code 208. The authentication/authorization 402 entity also determines whether the subscriber is entitled to receive the requested content. When both conditions are met, a content protection entity 404 is used to apply appropriate protections to the content prior to its delivery to the terminal 109 for display thereat. When the conditions are not met, an error message is displayed to the user.

In another variant, the device which reads the data code 208, and sends the record/queue request may further include MSO specific credentials stored on the device and associated with the MSO application used to make the request. These credentials are further used to authenticate/authorize a content request.

Additional content processing may occur at various entities of the managed network 202 including ensuring that a format or codec of the content is appropriate for the device which will receive and display it. Still further, the content may instead be delivered to a second device in communication with, associated to, or pre-designated by the requesting device.

In one embodiment, protection rules of the content are enforced via by utilization of copy protection rights (such as those utilized by the well known Digital Transmission Content Protection-Internet Protocol (DTCP-IP)) at the copy protection entity 404. In addition, the protection entity 404 may maintain a database of rights of specific requesting subscribers to access, use, copy, and/or distribute content. These rules are provided to, and implemented by, the terminal apparatus 109 of the present embodiment. Specifically, the terminal device 109 implements the protection rules when determining how the content may be used, including whether the content may be provided to the mobile device 106b itself or merely displayed at the terminal 109.

In another embodiment, the content may be protected via the establishment of an authorized service domain (ASD) or a trusted domain (TD). For example, using a downloadable CA (DCAS) approach, the necessary software and firmware if any can be downloaded to the terminal 109 and/or device 106b, thereby enabling designation thereof as a trusted domain for handling content. Exemplary trusted domain apparatus and methods are described in co-owned and co-pending U.S. patent application Ser. No. 13/674,866 published as U.S. Patent Application Publication No. 2013/0104162 filed Nov. 12, 2012 entitled "TECHNIQUE FOR SECURELY COMMUNICATING AND STORING PROGRAMMING MATERIAL IN A TRUSTED DOMAIN", and issued as U.S. Pat. No. 9,313,530 on Apr. 12, 2016, incorporated herein by reference in its entirety, although it will be recognized that other approaches may be used.

In one embodiment, the herein-described content restrictions may be implemented via the utilization of information stored within the data codes 208. For example, the data codes 208 may contain information relating to a date and/or time for an expiration thereof, a number of permissible usages thereof, or other rule relating to the use of the code.

In yet another embodiment, device and/or subscriber credentials or authorization information is used to is determined whether the data code 208 relates to a particular program which is not part of the subscriber's service level (e.g., the data code 208 is for an episode of "Homeland", and the subscriber is not a Showtime® subscriber). When it is determined that the subscriber is not authorized, the subscriber is presented with an option to subscribe to the service they do not currently have access to.

An exemplary method utilizing the network 400 of FIG. 4 is described herein.

Exemplary Methodology for the Access, Retrieval and Delivery of Restricted Content—

Figure 5:
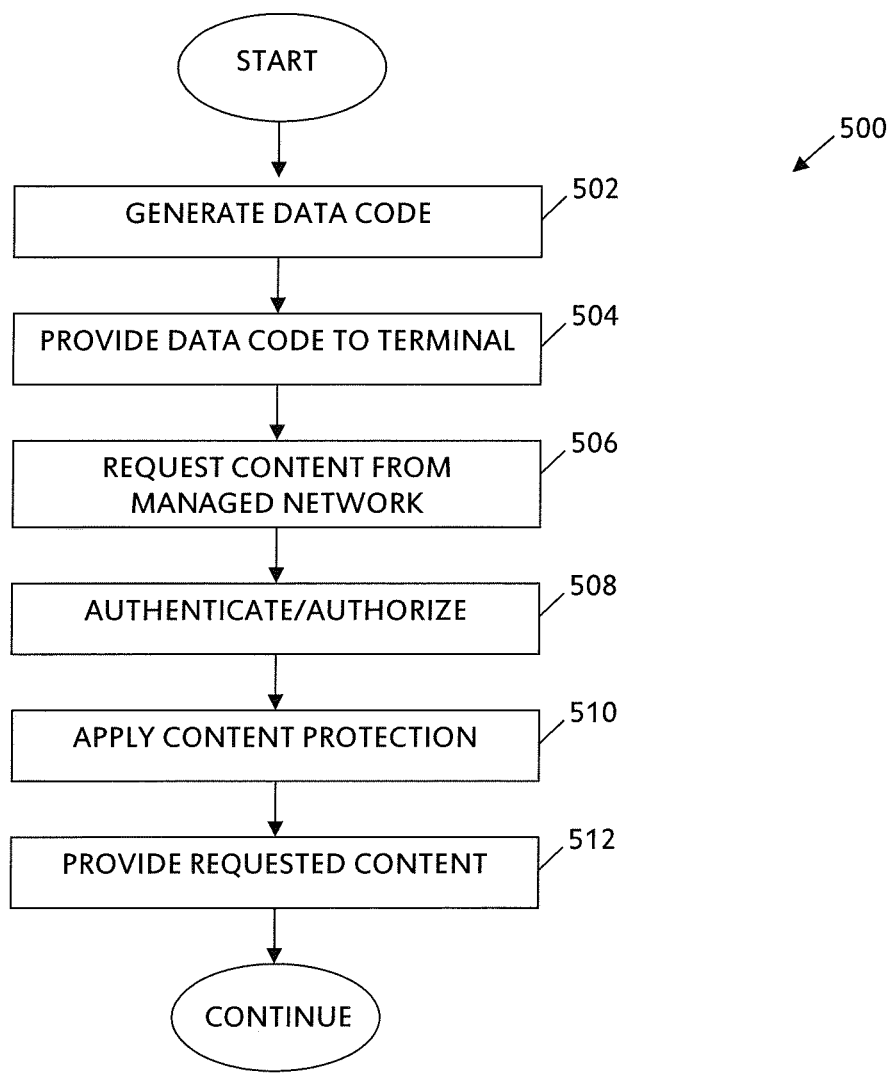
FIG. 5 is a logical flow diagram illustrating another exemplary embodiment of a generalized method for accessing, retrieving, and delivering content.

Referring now to FIG. 5, an exemplary embodiment of a method 500 for accessing, retrieving and delivering restricted content according to the disclosure is shown.

As shown, per step 502 of the method, a mobile device 106b uses information received from the network 202 and/or the subscriber (who is a user of the mobile device 106b) to generate a data code 208 representative of the subscriber's access level. In one example, the data code 208 of the present embodiment may be a representation of the subscriber account (such as an alphanumeric account number).

Per step 504, the data code 208 is read by the terminal 109. As noted above, the terminal 109 may comprise a non-complex entity configured to merely read the data code 208 and provide the same to the network 202. Alternatively, the terminal 109 may be configured to run a computer program thereon which enables the terminal 109 to extract information from the data code 208 necessary for identifying the subscriber (and therefore the subscriber's access level). The information or the data code 208 itself is transmitted to the managed network 202 from the terminal 109 at step 506 in the content request. In other words, the mobile device 106b requests content from the terminal 109 and, when prompted by the terminal, provides its data code 208. The data code (or information therein) is provided to the network for authentication/authorization purposes (see e.g., step 508).

The authentication/authorization step (step 508) comprises utilizing information contained in the data code 208 to authenticate the subscriber; i.e., ensure that the device 106b which provided the data code 208 is registered to a subscriber of the managed network 202 and ensure that the subscriber to which the device is registered is authorized to receive the requested content (based on e.g., a subscription level of the subscriber).

Before content may be provided to the device (step 512), at step 510 content protection policies are applied. In one embodiment, this may include utilization of a content protection policy file which identifies particular rights, rules, and/or protections to which each of the individual ones of the content stored at the server 204 are associated. Content protection mechanisms may further include utilization of digital rights management (DRM) or other copy protection, copy prevention, and/or copy control technology. Furthermore, copy protection policies may be applied on a per-subscriber basis. That is, in one variant, the particular protections that are applied to content vary based on one or more characteristics of the subscriber. For example, if the device is registered to a subscriber within a higher tier, a first set of policies may be applied that enable more functions than those offered to subscribers within a lower tier. Other subscriber characteristics may include a subscriber's entity status as a registered content distributor (i.e., registered with the network to copy and/or transfer one or more copies of content to other devices). In addition, or alternatively, the content protection rules applied may vary based on one or more characteristics of the receiving device. For example, when it is determined that the receiving device is a digital video recorder (DVR) apparatus, the content may be cleared for recording. In another example, if it is determined that the device is a so-called "trusted device" more or different rights may be bestowed on the content (i.e., it will have fewer or different copy protection rules).

The foregoing methods may be used for example, to enable a network subscriber to access and display content he is entitled to on any terminal device (such as a terminal operated by the managed network 202 or a terminal device of another or non-managed network) capable of reading the data code generated by the subscriber's mobile device. Additionally, the subscriber may be able to access content available to his/her subscriber account on any other device (including e.g., devices of other non-subscribers).

Network Architecture for Network Agnostic Content Access and Retrieval—

Figure 6:
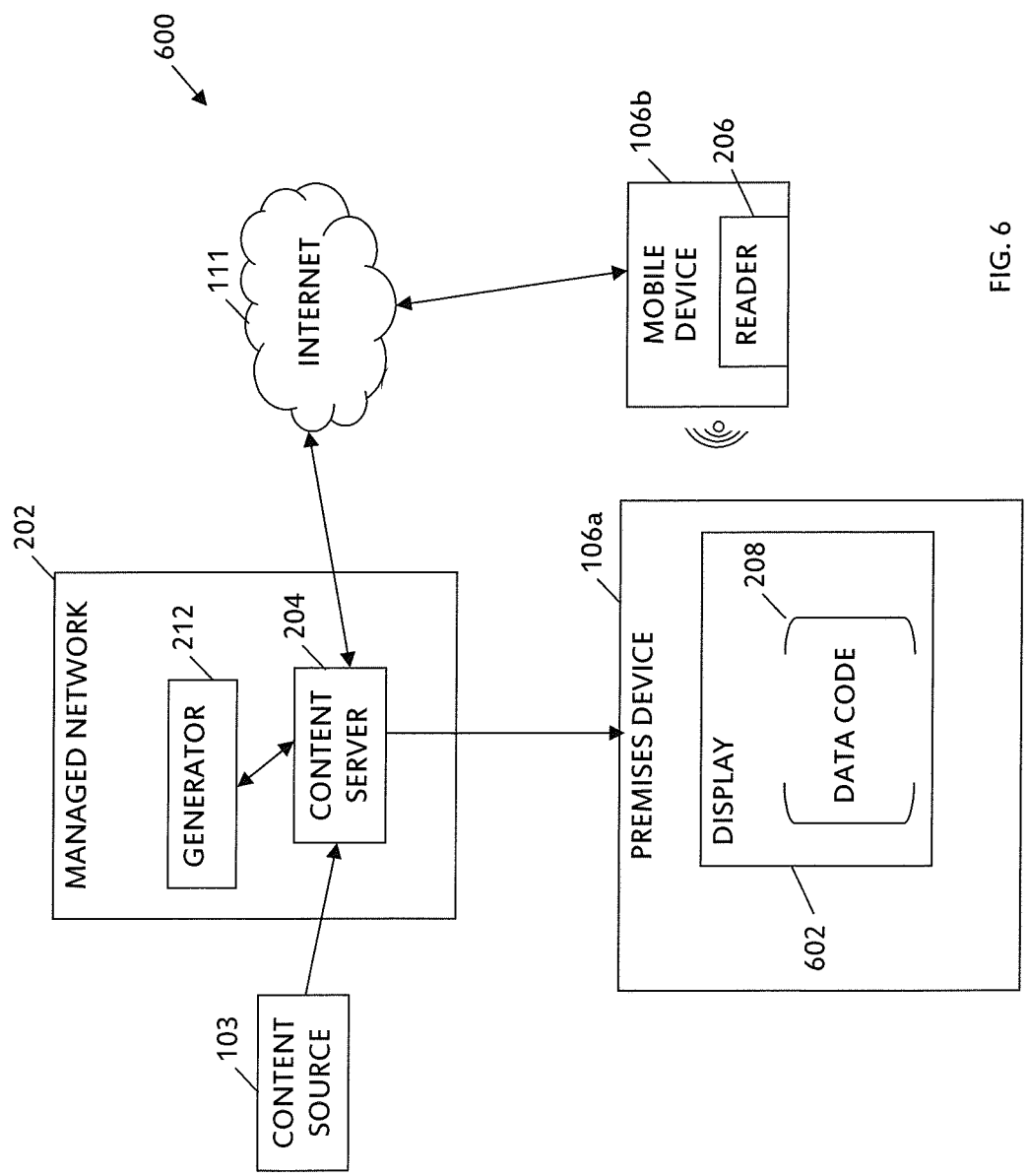
FIG. 6 is a functional block diagram illustrating yet another exemplary embodiment of a network architecture configured in accordance with the present disclosure.

An exemplary access and retrieval network architecture 600 for the network agnostic delivery of content is illustrated in FIG. 6. As shown, the network 600 generally comprises a content source 103 which provides content to a content server 204 of a managed network 202. In one embodiment, the managed network 202 is of the type discussed above with respect to FIGS. 1-1d.

In addition, the managed network 202 further comprises a content server 204 and data code generator 212. Content which is uploaded to the content server 204 from the content source 103 is associated to a uniquely generated data code 208 (generated by the data code generator 212), the data code 208 may be used to locate the content at the network as discussed elsewhere herein. In another embodiment (not shown), the data code is generated by an entity associated with the content source 103 rather than the managed network 202. Records associating each content or data item to a particular data code 208 are stored at a database (not shown) within the managed network 202 and in communication with the content server 204. The content server 204 accesses this database when information from the data code 208 is received (in connection with a request for content) to identify and locate the content.

As shown, content is provided to a premises device 106a which is able to display the content at a display device 602. In addition, the display device 602 displays the data code 208. In one embodiment, the data code 208 may be automatically displayed as an "always on" code in an inconspicuous location on the display screen. Alternatively, the data code 208 may be presented upon user request (such as via a series of button presses and menu options) so as not to take up valuable display screen real estate.

Content, including the data code 208 associated therewith, may be provided to the premises device 106a over a cable network (such as that discussed above with respect to FIGS. 1-1d) or alternatively via any other network configuration (including e.g., a satellite network, the Internet, etc.). A mobile device 106b in proximity to the premises device 106a further comprises a data code reader 206 and is able to read the data code 208 presented by the display 602. The mobile device 106b is in communication with the managed network 202 (such as via the Internet 111) and uses information in the data code 208 to access the content which was displayed at the premises device 106a. In another embodiment, a user of the mobile device 106b may elect to have the requested content provided to another device (not shown) identified by the user of the mobile device 106b either at the time of the request, or prior to requesting (such as during a system set-up). In other words, the mobile device 106b may elect from a list of associated devices, including other mobile devices, set top boxes, etc., or alternatively enter an identifier of a device to which content should be sent (such as by MAC address, IP address, etc.).

An exemplary method utilizing the network 600 of FIG. 6 is described herein.

Exemplary Methodology for the Access, Retrieval and Delivery of Network Agnostic Content—

Figure 7:
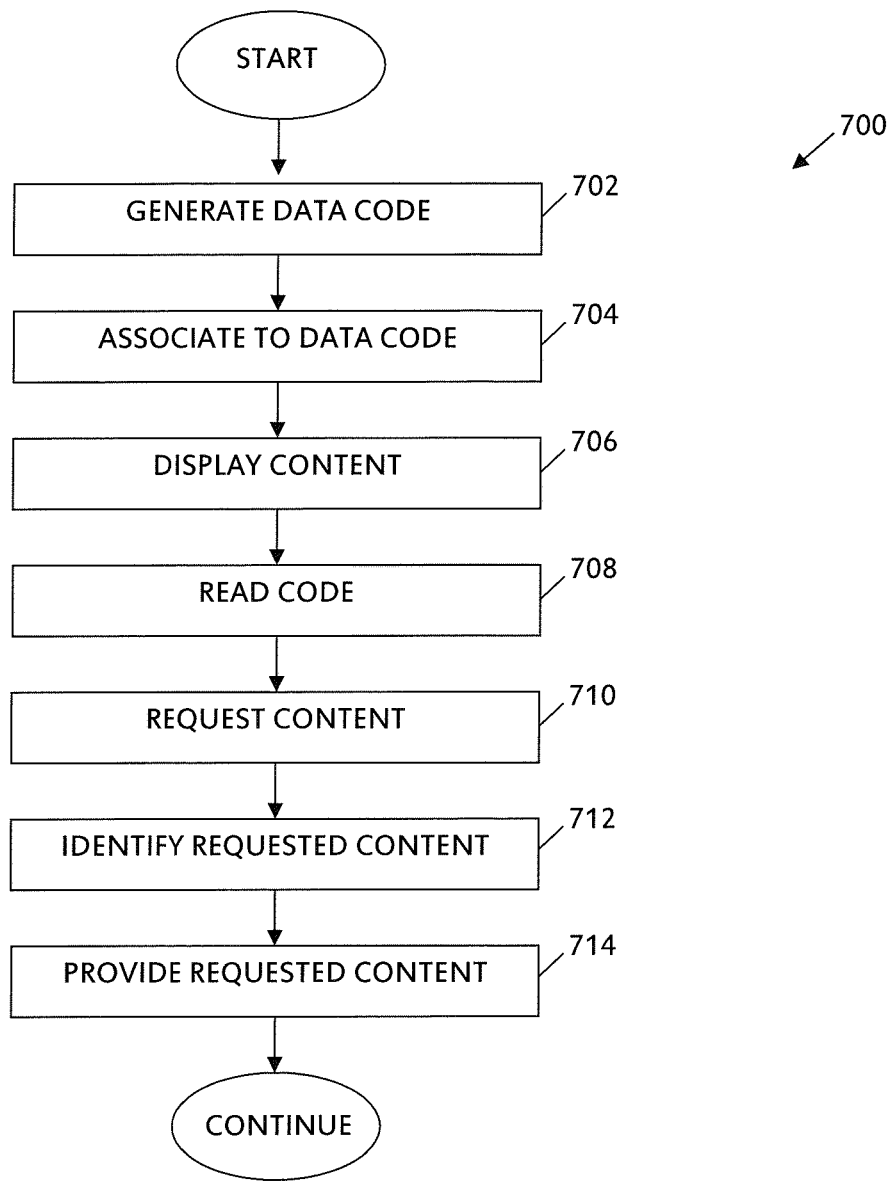
FIG. 7 is a logical flow diagram illustrating yet another exemplary embodiment of a generalized method for accessing, retrieving, and delivering content.

Referring now to FIG. 7, an exemplary embodiment of a method 700 for accessing, retrieving and delivering network agnostic content according to the disclosure is shown.

The foregoing methods may be used for example, to enable a content source 103 to provide a non-intrusive, highly effective means for viewers to access content when they are away from their homes for immediate or delayed delivery thereof.

Per step 702, a data code 208 is generated for each content element to be uploaded to the content server 204. In one embodiment, data codes 208 are generated by a data code generator entity 212 at the managed network 202. Alternatively, the data code generator may be provided at the content source 103 prior to upload of the content to the server 204. Next, per step 704, each content item is associated to a unique data code 208. As noted above, this may occur at either the content source 103 or the managed network 202. In addition, a database entity at the managed network 202 stores a record associating each content element to its respective data code 208. The content may then be provided for display at a consumer device (whether located at a subscriber premises or a mobile apparatus).

At step 706, the data code 208 for the content is displayed at the display device. In one embodiment, the data code 208 is always displayed on a portion of the display area. For example, the data code 208 may be permanently placed as an overlay to the content in a non-intrusive area such as a corner or banner across the bottom or top of the display. In another embodiment, the data code 208 is only displayed on user request. That is to say, the user must via a series of menu screens and/or button presses, actively elect to have the data code 208 for a currently provided program displayed.

Once the data code 208 is displayed, another client device (such as a mobile device 106b) uses a data code reader 206 associated therewith to read the code 208 (step 708). Information in the data code 208 is used by the device to request the content from the managed network 202 (step 710). In one embodiment, the device communicates the request for content to the managed network over the Internet 111; however, it is appreciated that the device may communicate with the network directly or over any appropriate network.

As noted above, each data code 208 is unique to a particular content item and associated to a specific portion of a storage entity, hence information contained in the data code 208 is used by an entity of the managed network 202 to identify the requested content at step 712. Once identified, the content is provided at step 714. The requested content may be provided to the requesting device (e.g., mobile device 106b), a second client device which the requesting device has designated in its initial request, or a previously identified device which a user has pre-registered as the default device for receiving content requests from data code reads.

The foregoing methods may be used for example, to enable a content source to distribute content in a first network. The content identifies itself (via the data codes) in such a way so as to enable device users of another network to easily have the content provided via their own network and to any of their devices.

It is further appreciated that the foregoing methods and apparatus (such as those of e.g., FIGS. 6-7) may be utilized to enable a user to use a mobile apparatus (or other device having a data code reader) to read a data code and provide a message to the network indicating that the content associated with the read data code should be further associated to a particular subscriber account. This may be accomplished by e.g., registering the mobile device to a subscriber account. At a later time, the user may access a list of linked content and identify (such as by providing a MAC address or IP address, or based on pre-registration of various device to the subscriber account) a device on which the content associated with the data code is to be displayed. In a further variant, the data codes may be updated (changed) periodically, such as once per minute, once per 30 seconds, etc. Each data code is therefore tied to a particular temporal location within content. In this manner, the user may read the data code at a particular time during the display thereof (for example, 14:40 minutes into the program) and later, when the subscriber elects to have the content associated with the data code played on an identified device, the playback will pick up at approximately the same location the user previously stopped viewing.

Exemplary User Device—

Figure 8:
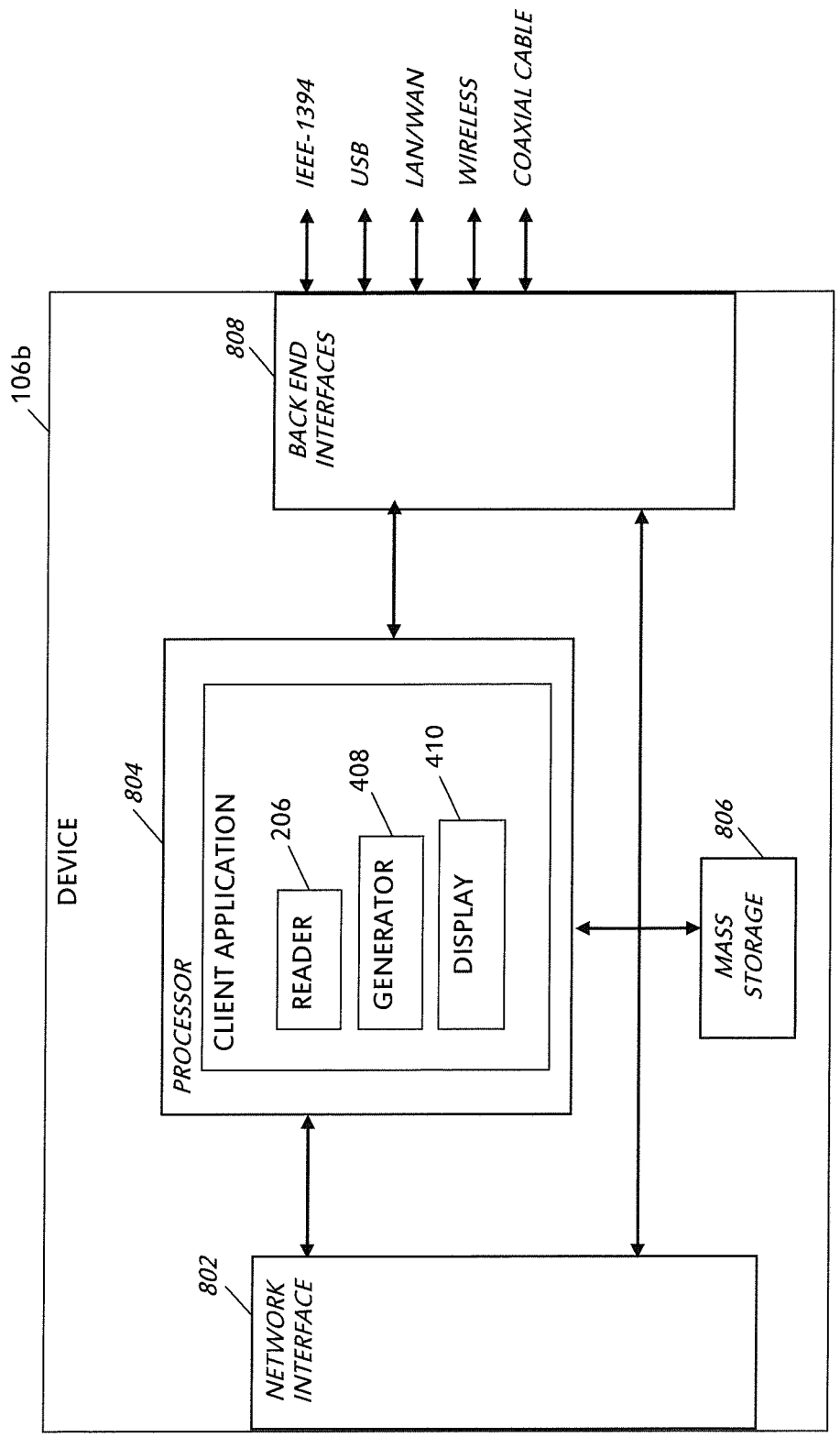
FIG. 8 is a functional block diagram illustrating an exemplary embodiment of a client device according to the present disclosure.

An exemplary client device (or CPE) 106b useful with the present disclosure is illustrated in FIG. 8. The device 106b may comprise for instance any device capable of requesting, receiving, and/or decoding content, whether for display thereon, or for recording, display, or storage on a device in communication therewith. Exemplary devices include set top boxes, television sets, laptop and desktop computers, smartphones, personal media devices (PMD), tablets, netbooks, etc. While discussed as specifically a mobile apparatus, the exemplary device 106b may in one embodiment be registered to a single physical location (such as a user premises). In one exemplary embodiment, the device 106b makes use of a digital rights management (DRM) content protection scheme to comply with limitations on certain content, or provide authorization credentials with respect to protected content.

As shown in FIG. 8, the device 106b generally includes e.g., a network interface 802, a digital processor 804 and associated storage 806, and optionally a plurality of back end interfaces 808 for communication with other devices.

The network interface 802 enables communication between the device 106b and the network 202 and/or the Internet 111. One or more of the backend interfaces 808 are used for communication with other devices (such as e.g., a premises device 106a or terminal apparatus 109).

The processor 804 is configured to run one or more of the illustrated applications including e.g., a data code reader application 206, a data code generator application 408, and/or a data code display application 410. The aforementioned applications (206, 408, and/or 410) may be preinstalled on the apparatus 106b, or downloaded from the managed network 202 and are stored at the storage apparatus 806.

The data code reader application 206 in the illustrated embodiment comprises a software application run on the device 106b; however it is appreciated that in another embodiment, the software may utilize one or more hardware components (not shown). The code reader application 206 is configured to enable the device 106b to read the data code 208. In other words, the code reader application 206 is specifically designed to recognize and interpret the data code 208. The data code 208 itself may be read from a display associated with another device (either another mobile device 106b or premises device 106a), or a physical medium (such as a magazine, newspaper or other printed material, business card, guide, purchasable printed item, billboard, poster, etc.). The code reader application 206 processes the data code 208 to information usable by the system. In one embodiment, the data code 208 and/or the information generated therefrom via the data code reader application 206 is transmitted to a network entity (such as the aforementioned content server 204) and used to identify and request particular content. As noted elsewhere herein, the identified content may be transmitted from the network entity back to the device which transmitted the request, or to another device either designated by the requesting device (such as via another program running thereon), or pre-designated by the subscriber as a default device to which all such content is to be forwarded.

The data code generator application 408 in the illustrated embodiment comprises a software application run on the device 106b and configured to use information regarding a subscriber associated to the device 106b to generate a subscriber specific data code 208. In one embodiment, this occurs via communication between the application 408 and one or more entities of the managed network 202. The network provides authorization, authentication, and other information necessary to enable the application 408 to generate the data code 208. In addition, the network 202 may provide information relating to a time window during which the data code 208 may be used. The data code generator application 408 utilizes the timing information to create a temporarily useable code 208. In this manner, the subscriber specific data codes 208 can be displayed on a display apparatus of the device (not shown) and read by e.g., a data code reader of another device (such as another mobile device 106b, a consumer premises device 106a, a terminal device 109, etc.). The data code 208, when read and transmitted by the reading device to the network in order to request content, may identify the content and/or the data code itself 208 as being only temporarily available.

The data code display application 410 provides the ability for the data code 208 to be displayed by the device 106b. In one embodiment, the data code 208 is generated (as discussed above) by the data code generation application 408. Alternatively, the data code 208 may be downloaded from the managed network 202 (either directly therefrom or via the Internet 111) and stored at the storage entity 806. In either instance, the data code 208 once generated and/or obtained is processed by the data code display application 410 and sent to a display apparatus of the device 106b (not shown) for display thereby.

In yet another embodiment, the CPE 106 further comprises a hard drive in communication therewith or integrated therein which acts as a digital video recorder (not shown).

Audio Cues—

In yet another embodiment, the foregoing data codes 208 may comprise audio cues. For example, the audio fingerprints/codes may be at an audible or an inaudible frequency range and used to trigger a listening application at the consumer or terminal device.

In one variant, the exemplary access and retrieval network architecture for the delivery of unrestricted content may be utilized (such as that illustrated in FIG. 2). According to this variant, the data code generator at the managed network generates a unique audio cue for each content element uploaded to the content server. Alternatively, the content source may be charged with generating and applying audio cues to the content. A mobile device runs a client application thereon which enables the mobile device to use a software or hardware implemented listening application to listen to the audio cue. The mobile device may then use data derived from the audio cue to request content from the network. The content server accesses records or a database when information from the audio cue is received in connection with a request for content. It is further noted that, in this variant, the mobile device users which request access to the content are not required to be subscribers to the managed network in order to receive access to the content.

In one exemplary embodiment, the audio cues contain information relating to an address or URL within the storage apparatus. In a further embodiment, the audio cues may contain information relating to a date and/or time for an expiration thereof, a number of permissible usages thereof, or other rule relating to the use of the accessed content.

The herein discussed audio cues may be used to access, retrieve, and deliver unrestricted content (such as occurs in the exemplary method of FIG. 3). Such a method may comprise, for example: (i) uploading content from a content source to the content server, (ii) associating the uploaded content to a unique audio cue, (iii) distributing the audio cue, (iv) listening for the audio cue at a mobile device, (v) requesting content from the content server using information contained in the audio cue, (vi) identifying the content using information obtained from the audio cue, and (vii) providing the identified content.

Additionally, audio cues may be utilized in the architecture of FIG. 4 when the content comprises restricted content. In this instance, the mobile device uses information about a subscriber of the network to generate subscriber specific temporary audio cues. A terminal listens to the audio cue, and communicates with the managed network to request content. A content server uses information provided in the request to query a database and identify the requesting subscriber, as well as the content being requested. An authentication/authorization entity at the managed network identifies whether the requesting device is associated to an authenticated subscriber via information contained in the audio cue. The authentication/authorization entity also determines whether the subscriber is entitled to receive the requested content. When both conditions are met, a content protection entity is used to apply appropriate protections to the content prior to its delivery to the terminal for display thereat. When the conditions are not met, an error message is displayed to the user.

The herein discussed audio cues may be used to access, retrieve, and deliver restricted content (such as occurs in the exemplary method of FIG. 5). Such a method may comprise, for example: (i) the mobile device generating an audio cue representative of the subscriber's access level, (ii) a terminal device listening to the audio cue, (iii) transmitting information from the audio cue, or the audio cue itself from the terminal to the managed network, (iv) utilizing information contained in the audio cue to authenticate the subscriber, (v) applying content protection policies, (vi) providing the content to the device.

Still further, the herein described audio cues may be used for network agnostic access, retrieval, and delivery of content (such as via a network architecture similar to that illustrated in FIG. 6). In this variant, audio cues are generated by the network or the content source. Content is provided to a premises device which displays the content at a display device and plays the audio cue (either as an "always on" cue, or only upon specific request). A mobile device in proximity to the premises device is able to listen to the audio cue presented by the display device and use information contained therein (or the cue itself) to request access the content which was displayed at the premises device.

The herein discussed audio cues may be used to access, retrieve, and deliver network agnostic content (such as occurs in the exemplary method of FIG. 7). Such a method may comprise, for example: (i) generating an audio cue for each content element to be uploaded to the content server, (ii) associating each content item to a unique audio cue, (iii) playing the audio cue for the content at a display device, (iv) a mobile device listening to the audio cue, (v) the mobile device using information in the audio cue to request the content from the managed network, (vi) an entity of the managed network using the information to identify the requested content, and (vii) providing the requested content.

Many other approaches and combinations of various operational and business paradigms are envisaged consistent with the present disclosure, as will be recognized by those of ordinary skill when provided this disclosure.

It will be recognized that while certain aspects of the present disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the ideas set forth herein. The foregoing description is of the best mode presently contemplated of carrying out the disclosure. This description is in no way meant to be limiting, but rather should be taken as illustrative of the general principles of. The scope of the disclosure should be determined with reference to the claims.

What is claimed is:

1. A client device configured for use in a content delivery network, said client device comprising:
    a first interface configured for communication to said content delivery network, said content delivery network being configured to deliver particular media content for display on a display device not part of the client device;
    a storage apparatus; and
    a processor, said processor configured to execute at least one computer program on the storage apparatus, said at least one computer program comprising a plurality of instructions which are configured to, when executed, cause the client device to:
        at a first time, read a unique data code displayed on the display device, the unique data code corresponding to the particular media content displayed on the display device; and
        utilize information contained in the unique data code to request the particular media content from a storage entity of said content delivery network, and cause delivery to said client device;
    wherein said unique data code displayed on the display device and timestamp data correlated with said unique data code are automatically changed at least once to a second unique data code correlated with second timestamp data, the automatic change occurring during rendering of the particular media content on the display device so as to enable a subscriber of the client device to, at a second time subsequent to the first time, render said particular media content on the client device at a particular timestamp thereof, where the particular timestamp corresponds to the timestamp data effective during the first time at which the unique data code displayed on the display device was read by the client device.

2. The client device of claim 1, wherein said unique data code comprises data configured to uniquely identify said particular media content; and wherein said plurality of instructions are further configured to, when executed, cause the client device to:
    read said unique data code via a scanner associated with said client device; and
    process said unique data code to generate said information contained in said unique data code.

3. The client device of claim 2, wherein said unique data code is readable from at least one of a physical medium or a display apparatus.

4. The client device of claim 1, wherein said unique data code comprises data configured to uniquely identify said subscriber associated to said client device; and
    wherein said at least one computer program is further configured to, when executed, cause the client device to utilize said unique data code to authenticate said subscriber and validate a right of said subscriber to said particular media content.

5. The client device of claim 1, wherein said automatic change of said unique data code displayed on the display device and said timestamp data correlated with said unique data code comprises an association of the unique data code with a timestamp within the particular media content that is later than a timestamp with which the unique data code was previously associated.

6. The client device of claim 1, wherein said plurality of instructions are further configured to, when executed, cause the client device to cause delivery of the particular media content to a second client device in data communication with the client device and pre-designated by a user of the client device.

7. Computer readable apparatus comprising a non-transitory storage medium, the non-transitory storage medium comprising at least one computer program having a plurality of instructions, the plurality of instructions configured to, when executed on a processing apparatus, cause a computerized client device to:
    at a first time, read a unique data code displayed on a display device, the unique data code corresponding to a particular media content displayed on the display device; and
    utilize information included in the unique data code to request the particular media content from a storage entity of a content distribution network;
    wherein the unique data code displayed on the display device and timestamp data correlated with the unique data code are automatically changed at least once to a second unique data code correlated with second timestamp data, the automatic change occurring during rendering of the particular media content on the display device so as to enable at least the computerized client device to, at a second time subsequent to the first time, render the particular media content at a particular timestamp thereof, the particular timestamp corresponding to the timestamp data effective during the first time at which the unique data code displayed on the display device was read by the computerized client device.

8. The computer readable apparatus of claim 7, wherein the utilization of the information included in the unique data code to request the particular media content comprises transmission of data representative of a request for access of the particular media content on a second computerized client device different than the computerized client device, the access enabling the second computerized client device to render the particular media content at the particular timestamp thereof.

9. The computer readable apparatus of claim 8, wherein the transmission of the data representative of the request comprises transmission of data enabling identification of at least one of a subscriber or a subscriber account associated with at least one of (i) the computerized client device, or (ii) the second computerized client device, the data enabling the identification of the at least one of the subscriber or the subscriber account configured to enable authorization of the access.

10. The computer readable apparatus of claim 7, wherein the display device is part of a premises device disposed at a premises of a user of the computerized client device.

11. The computer readable apparatus of claim 7, wherein the unique data code comprises data configured to uniquely identify a subscriber associated to the computerized client device.

12. The computer readable apparatus of claim 7, wherein the automatic change of the unique data code displayed on the display device and said timestamp data correlated with said unique data code comprises an association of the unique data code with a timestamp within the particular media content that is later than a timestamp with which the unique data code was previously associated.

13. The computer readable apparatus of claim 7, wherein the unique data code is readable from at least one of a physical medium or a display apparatus.

14. The computer readable apparatus of claim 7, wherein the read of the unique data code displayed on the display device comprises a read of the unique data code which is overlaid over a display of the particular media content.

15. A computerized method for accessing and delivering digital content in a content distribution network having a plurality of computerized client devices, the computerized method comprising:
    causing display of a plurality of unique data codes on a display device, respective ones of the plurality of unique data codes (i) associated with respective portions of the digital content displayed on the display device, and (ii) configured to automatically change, during rendering of the digital content on the display device, the automatic changing enabling a first computerized client device of the plurality of computerized client devices to, at a then-current time, read a first one of the plurality of unique data codes associated with a particular timestamp during the rendering of the digital content on the display device;
    at a time subsequent to the then-current time, receiving data representative of a request for access of the digital content for rendering thereof at the particular timestamp, the data representative of the request (i) originating from the first computerized client device and (ii) comprising data associated with the first one of the plurality of unique data codes; and
    based at least on receiving of the data representative of the request, utilizing the data associated with the first one of the plurality of unique data codes to enable the access of the digital content for the rendering thereof at the particular timestamp.

16. The computerized method of claim 15, further comprising generating the plurality of unique data codes at a computerized server entity of the content distribution network, the generating comprising associating the respective ones of the plurality of unique data codes to the respective portions of the digital content, the respective portions of the digital content stored at a storage entity of the content distribution network.

17. The computerized method of claim 15, wherein the causing of the display of the plurality of unique data codes on the display device comprises causing display of the plurality of unique data codes as an overlay to a display of said respective portions of the digital content.

18. The computerized method of claim 15, wherein:
the content distribution network comprises a managed network; and
the digital content is associated with a content distribution network other than said managed network.

19. The computerized method of claim 15, wherein:
the receiving of the data representative of the request for the access of the digital content for the rendering thereof at the particular timestamp comprises receiving the data representative of the request from the first computerized client device, the request being for the access of the digital content by a second computerized client device; and
the utilizing of the data associated with the first one of the plurality of unique data codes to enable the access of the digital content for the rendering thereof at the particular timestamp comprises enabling the second computerized client device to render the digital content at the particular timestamp thereof.

20. The computerized method of claim 15, wherein the utilizing of the data associated with the first one of the plurality of unique data codes to enable the access of the digital content for the rendering thereof at the particular timestamp comprises utilizing subscriber specific information to authorize a user of the first computerized client device for the access of the digital content for the rendering thereof at the particular timestamp.

\* \* \* \* \*